Patented Dec. 15, 1931

1,836,577

UNITED STATES PATENT OFFICE

ROY CROSS, OF KANSAS CITY, MISSOURI, ASSIGNOR TO CROSS DEVELOPMENT CORPORATION, A CORPORATION OF DELAWARE

REFINING MATERIAL

No Drawing.    Application filed September 29, 1924.    Serial No. 740,448.

This invention relates to improvements in refining materials, and refers more particularly to those substances which may be utilized to purify hydrocarbon oils; that is, to deodorize, decolorize and desulphurize such oils as the relatively light products at the present time marketable as fuel for internal combustion engines and commonly known as gasoline or gasoline-like products.

These gasoline-like products include naphtha, benzene, kerosene, or other relatively light hydrocarbons which have a relatively low boiling point. Such products are usually—prior to refining—contaminated with certain sulphur compounds, gums, resinous material, water, or other deleterious matter which is objectionable. Normally, these impurities are removed by refining treatments either by subsequent redistillation, acid and basic treatments, or innumerable types of filtering. The objectionable products most difficult to remove seem to be certain of the sulphur compounds which are combined with the hydrocarbon products so that repeated treatments by different refining materials are oftentimes ineffectual to reduce the hydrocarbons to a proper or marketable condition which is normally ascertained by what is termed as the "Doctor" and "Copper corrosion" tests and by the "Gumming" test. Other well known tests are imposed to ascertain the range of boiling points, the amount of resinous material present, and other qualities of the oil.

The material hereinafter explained and utilized as a refining substance, has been effectively used to remove these objectionable impurities and a clean, sweet, water-white product obtained. Certain of the combinations are somewhat more efficient than others, although with any of the mixtures a satisfactory product, from a marketable viewpoint, may be obtained.

In its broader aspects, the invention lies in the combination, or intimate mixture, of a highly adsorbent material with a metallic salt having a strong affinity for the sulphur compounds, which mixture is utilized as a filtering material either for the liquid hydrocarbons accompanied by heat and pressure, or for the hydrocarbon materials treated in the vapor phase also accompanied by heat and pressure, if desired.

Experimentation has proven that satisfactory materials may be obtained by the combination of inorganic earthy materials in a finely divided state, or in solution, such as certain of the clays which are highly adsorbent with copper compounds which have a particular affinity for the sulphur in the oil. Specifically, certain of the clays mined in some of the western states, and naturally occurring as a clay commercially known as "Bentonite", have proven highly effectual in combination with the metallic salts. These clays are highly adsorbent, and have the quality of adsorbing an immense amount of liquid relative to the amount of material used, probably due to the colloidal nature of the clay amounting substantially to peptization.

In combining the metal salt with the finely comminuted or colloidal clay, the best results are obtained by dissolving the salt in a liquid solvent and adding the solution to the clay to form a gel. With common clays a good colloidal condition is not attained. After thoroughly incorporating the liquid and clay into a smooth paste, or cream, the solvent is driven off, which results in the deposition of the minute particles of the metal salt from the solution upon the comminuted clay material. This removal of the solvent is preferably effected by heating the paste to temperatures of from 250° F. to 1200° F. whereby the solvent is completely driven off, leaving the metal in the form of oxides and salts or in a pure metallic state depending upon the temperature to which the material is heated and upon the atmosphere in which the heating takes place. Thus, the mixture has not only the advantage of the highly adsorbent clay, but also the increased activity given the metal salt by its intimate mixture in a finely divided state upon the immense surface exposure of the clay material presented to the action of the hydrocarbon. A good clay yields ultra-microscopic particles with water solution of the salt. As an example of the increased activity, it is a well known fact that when a mixture, such as sodium plumbite or a solution of sugar of lead, is added to a sulphur containing oil, a black precipitation will be formed of the sulphur compounds and gradually collect in the bottom of the container. This precipitation is formed during a considerable period of time, while when treated with the mixture of highly adsorbent material with the metal salt, such as hereinbefore explained, the formation of the precipitation is substantially instantaneous showing the increased availability of the combinative metal and its augmented effectiveness due to its comminuted form and presence on the tremendous surface exposed by the adsorbent material. Other metals, besides copper, give good results, varying naturally with their affinity for the sulphur compounds. Iron, lead, manganese, zinc, antimony, and other metals which have the ability of combining with sulphur and other impurities to remove them from the oil, have given good results. To dissolve such metals, in order to combine them in a gel with the adsorbent materials, such solvents as water, alcohol, glycerin, ethylene-glycol, and other solvents which do not readily dissolve in the oil nor dissolve any substantial amount of the hydro-carbon materials, may be used.

The earthy, or clay adsorbent materials, include a large number of hydrous aluminum silicates and zeolites as bentonite, fuller's earth, green sands, permutite, refinite, borromite, heulandite, phillipsite, hormatone, stilbite or desmine, laumontite, chabazite, analcite, natrolite, scolecite, thomsonite and pyrophyllite. Also, a satisfactory treating material may be made by treating a sodium aluminum silicate or a copper aluminum silicate with sulphuric acid whereby a copper silicate alumina gel is formed which may be utilized with or without other metallic salts in the same manner as the refining materials mentioned previously.

In any case, the treatment of the oil is affected by use of an adsorbent material intimately combined with a comminuted metallic salt which has the quality of readily combining and extracting, from the hydrocarbon, the objectionable sulphur compounds.

By the use of this material, the sulphur may be removed from the oil to an extent that it cannot be detected by ordinary means. Thus, a product is formed which is free from the ordinary properties of gasoline which tend to give the knocking effect to the motor in which it is used.

It is recognized that heretofore oils have been treated with adsorbent clay material, and, in some cases, with gels or clays in combination with liquids in the form of creamy muds or pastes. It is also recognized that certain dehydrated, natural or artificial, inorganic gels made from fuller's earth or the like have been utilized for the treatment of hydrocarbon products. Also, oils or oil vapors have been treated by successive treatments, with a metallic substance having an affinity for the sulphur compounds and with an adsorbent material to remove other impurities, but to combine the metallic salt with a highly adsorbent material in the manner described and simultaneously treating the oil or oil vapor to produce a clean, sweet, water-white product, is not common practice.

For reuse, the mixture of the adsorptive material and the metal is ignited at temperatures similar to those used in driving off the solvent as explained heretofore, namely, at temperatures of from 250° F. to 1200° F. When treated for reuse, the heat utilized to drive off the deleterious material may effect a chemical change in the state of the metal, forming oxides from the salts, or reducing it to pure metallic form.

The treatments, described as being old in the art, have been somewhat unsatisfactory, as they have been relatively ineffective in removing the required sulphur content and other objectionable qualities of the distillate. Another impurity difficult to extract is the gum or resinous content which clings tenaciously to the hydrocarbon, but has been almost entirely eliminated by the treatment described.

While the use of this refining material has been generally explained in connection with the treatment of the oil while in the liquid phase, it may be as effectively used, and in some case with better results, where the treatment takes place while the hydrocarbon material is in the vapor phase. Further, the addition of heat, even in the liquid phase, may increase materially the activity of the substances.

While it is obvious that all distillates of a gasoline-like character are included, the refining of kerosene may be specifically mentioned as the material may be most effectively used in the purification of this product, eliminating the necessity of subsequent redistillation to free the product of objectionable qualities.

In connection with the treating of gasoline distillate, this type of refining material removes practically all trace of color as the treated oil invariably gives a color test of over 21 according to the Saybolt scale.

Under certain conditions, it has been found to be advantageous to add certain basic materials, including earthy substances such as compounds of calcium, magnesium, barium, strontium and the like, also alkalies, such as caustic soda, have served to neutralize any acid or acid effect not removed by the adsorbent material.

I claim as my invention:

1. A refining material for hydrocarbon oils, consisting of an intimate combination of highly adsorbent water insoluble hydrous aluminum silicate and copper.

2. A refining material for hydrocarbon oils, consisting of an intimate combination of fuller's earth and copper in a finely divided condition.

3. An oil refining material consisting of the residue left after heating an adsorbent clay on which a copper salt has been deposited from solution, the residue being characterized by intimate commingling of the decomposition products of the copper salt on the surfaces of the clay particles.

4. An oil refining material characterized by intimate commingling and surface covering of the ultimate particles of an adsorbent clay by particles of copper.

5. An oil refining material characterized by intimate commingling and surface covering of the ultimate particles of an adsorbent clay by particles of copper oxide.

6. An oil refining material characterized by intimate commingling and surface covering of the ultimate particles of an adsorbent clay by particles of copper salt.

7. An oil refining material characterized by intimate commingling and surface covering of the ultimate particles of an adsorbent clay by particles of copper and copper oxide.

8. An oil refining material characterized by intimate commingling and surface covering of the ultimate particles of an adsorbent clay by particles of copper and copper salt.

9. An oil refining material characterized by intimate commingling and surface covering of the ultimate particles of an adsorbent clay by particles of copper oxide and copper salt.

10. An oil refining material characterized by intimate commingling and surface covering of the ultimate particles of an adsorbent clay by particles of copper, copper oxide and copper salt.

11. An oil refining material consisting of the residue left after heating fuller's earth on which a copper salt has been deposited from solution, the residue being characterized by intimate commingling of the decomposition products of the copper salt on the surfaces of the earth particles.

12. An oil refining material consisting of the residue left after heating adsorbent silicate on which a copper salt has been deposited from solution, the residue being characterized by intimate commingling of the decomposition products of the copper salt on the surfaces of the silicate particles.

13. An oil refining material consisting of the residue left after heating a gel formed by a copper salt solution and colloidal silicate, the residue being characterized by intimate commingling of the decomposition products of the copper salt on the surfaces of the silicate particles.

14. An oil refining material characterized by intimate commingling and surface covering of the ultimate particles of fuller's earth by particles of copper oxide.

15. An oil refining material characterized by intimate commingling and surface covering of the ultimate particles of fuller's earth by particles of copper salt.

16. An oil refining material characterized by intimate commingling and surface covering of the ultimate particles of fuller's earth by particles of any of the group comprising copper, copper oxide and copper salt.

ROY CROSS.